United States Patent
Trociewitz et al.

(10) Patent No.: US 9,966,167 B1
(45) Date of Patent: May 8, 2018

(54) SUPERCONDUCTING JOINT FOR HIGH-TEMPERATURE SUPERCONDUCTING $BI_2SR_2CACU_2O_{8+x}$ (BI-2212) WIRE

(71) Applicant: The Florida State University Research Foundation, Inc., Tallahassee, FL (US)

(72) Inventors: Ulf Peter Trociewitz, Crawfordville, FL (US); Peng Chen, Tallahassee, FL (US); David K. Hilton, Tallahassee, FL (US); Dmytro V. Abraimov, Tallahassee, FL (US); William L. Starch, Crawfordville, FL (US); David C. Larbalestier, Tallahassee, FL (US); Jianyi Jiang, Tallahassee, FL (US); Eric E. Hellstrom, Tallahassee, FL (US); Ernesto S. Bosque, Tallahassee, FL (US); Maxime Matras, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 514 days.

(21) Appl. No.: 15/052,276

(22) Filed: Feb. 24, 2016

Related U.S. Application Data

(60) Provisional application No. 62/129,266, filed on Mar. 6, 2015.

(51) Int. Cl.
*H01B 12/04* (2006.01)
*H01B 13/00* (2006.01)
*H02G 15/34* (2006.01)

(52) U.S. Cl.
CPC ......... *H01B 12/04* (2013.01); *H01B 13/0036* (2013.01); *H02G 15/34* (2013.01)

(58) Field of Classification Search
CPC ................................ H01B 12/04; H01B 12/00
See application file for complete search history.

(56) References Cited

U.S. PATENT DOCUMENTS

| | | | | |
|---|---|---|---|---|
| 2003/0029629 A1* | 2/2003 | Spreafico | ............... | H01B 12/06 174/125.1 |
| 2005/0236175 A1* | 10/2005 | Reis | ....................... | H01B 12/06 174/125.1 |

(Continued)

OTHER PUBLICATIONS

Larbalestier et al., Isotropic Round-Wire Multifilament Cuprate Superconductor for Generation of Magnetic Fields above 30 T. NatureMaterials. 2014. vol. 13: 375-381.

(Continued)

*Primary Examiner* — Timothy Thompson
*Assistant Examiner* — Amol Patel
(74) *Attorney, Agent, or Firm* — Molly L. Sauter; Smith & Hopen, P.A.

(57) ABSTRACT

The present invention provides a system and method for producing superconducting joints between superconductive segments of a Bi-2212 high-temperature superconducting (HTS) conductor, thereby eliminating the heat generating resistive joints that are commonly known in the art for connecting two or more smaller Bi-2212 conductive segments to create an Bi-2212 conductor of adequate length.

20 Claims, 4 Drawing Sheets

(56) References Cited

U.S. PATENT DOCUMENTS

| | | | |
|---|---|---|---|
| 2010/0099570 A1* | 4/2010 | Takayasu | H01B 12/02 |
| | | | 505/163 |
| 2015/0080221 A1* | 3/2015 | Delplace | H02G 15/34 |
| | | | 505/163 |
| 2016/0240297 A1* | 8/2016 | Iwasa | H01F 6/06 |
| 2017/0125924 A1* | 5/2017 | Lalitha | H01R 4/68 |
| 2017/0236627 A1* | 8/2017 | Walsh | H01F 6/006 |
| | | | 62/51.1 |
| 2017/0343629 A1* | 11/2017 | Wikus | H01F 6/065 |

OTHER PUBLICATIONS

Guo et al., Fabrication of joint Bi-2223/Ag superconducting tapes with BSCCO superconducting powders by diffusion bonding. Physica C. 2010. vol. 470: 440-443.

Hase et al., Fabrication of superconductively jointed silver-sheathed Bi-2212 tape. Cryogenics. 1996. vol. 36: 21-25.

Hase et al., Operation of superconductively jointed Bi-2212 solenoidal coil in persistent current mode. Cryogenics. 1997. vol. 37: 201-206.

Hase et al., Persistent-current-mode Operation of Bi-2212 Solenoidal Coil with a Clear Bore of 60 mm Diameter. Advances in Superconductivity X: Proceedings of the 10th International Symposium on Superconductivity (ISS '97). 1998: 952-928.

Hase et al., Development of Bi-2212 multifilamentary wire for NMR usage. Physica C. 2000. vol. 335: 6-10.

\* cited by examiner

SUPERCONDUCTING JOINT FOR HIGH-TEMPERATURE SUPERCONDUCTING $BI_2SR_2CACU_2O_{8+x}$ (BI-2212) WIRE

CROSS-REFERENCE TO RELATED APPLICATIONS

This application claims priority to currently U.S. Provisional Patent Application No. 62/129,266, having a filing date of Mar. 6, 2015 and entitled "A Practical Superconducting Electrical Joint Design For High-Temperature Superconducting $Bi_2Sr_2CaCu_2O_{8+x}$ (Bi-2212) Round Wire", which is herein incorporated in its entirety.

FEDERALLY SPONSORED RESEARCH OR DEVELOPMENT

This invention was made with government support under National Science Foundation (NSF) Award No. DMR-1157490 and National Institute of Health (NIH) Award No. 1R21GM111302-01. The government has certain rights in the invention.

FIELD OF INVENTION

This invention relates to the generation of superconducting electrical joints for use in superconducting electromagnets.

BACKGROUND OF THE INVENTION

Recent significant progress in conductor technology has resulted in three major high-temperature superconducting (HTS) conductors available in the field of commercial applications: Bismuth Strontium Calcium Copper Oxides (BSCCO), which comes in two stoichiometries and form factors, $Bi_2Sr_2CaCu_2O_{8+x}$ (Bi-2212) round wire conductor and $Bi_2Sr_2Ca_2Cu_3O_{10+x}$ (Bi-2223) tape conductor, and Rare Earth Barium Copper Oxides (ReBCO) tape conductor. These HTS conductors have been developed by research institutions and industry focusing on a high degree of applicability, and substantial efforts are currently being made to commercialize these HTS conductors. Two dominant application areas are driving HTS technology: the first is power generation and transport, an area for which ReBCO is highly suitable, and the second is high field magnet systems, an area for which Bi-2212 and Bi-2223 are preferred. Bi-2212 round wire shows great potential particularly for high-field magnets where high-field homogeneity and long-term field stability are required, as is the case in nuclear magnetic resonance (NMR) magnets, which have become essential in biological and medical science as tools to understand and decipher protein structures to enable the development of improved medical treatments. Accordingly, there is a strong motivation in the market for generating conductors capable of providing increasingly higher magnetic fields. However, currently used superconducting magnets made with low temperature superconductors (LTS), including Nb—Ti and $Nb_3Sn$, cannot operate in or generate fields above 25 T. In contrast to LTS conductors, HTS conductors retain the superconducting state at fields far above 100 T at liquid helium temperatures.

HTS conductors are produced in limited piece lengths, which are shorter than the lengths typically required to build high field magnet systems, commonly requiring several kilometers of conductor material. To provide a longer superconductor for use in high field magnet systems requires creating one longer length conductor by connecting multiple shorter length HTS conductors through the establishment of multiple electrical joints between the shorter HTS conductors. In conventional soldered electrical joints, ohmic losses in the joints contribute to the total heat generation of the coil formed by the HTS conductors which, in the best case, increases consumption of the cryogenic coolant and, in the worst case, may lead to premature quenching of the magnet, resulting in the loss of the superconducting properties and the magnetic field of the HTS conductor. As such, conventional resistive joints present a performance limiting factor in high-field coil design. Additionally, a magnet using resistive joints has to be operated with a power supply that is constantly powering the magnet in order to keep the operating current of the magnet constant. Providing a constant operating current requires the use of an extremely stable and expensive power supply and also requires a very advanced electronic control loop. In contrast, a fully superconducting magnet, having superconducting joints between the HTS conductors, can be operated in "persistence", meaning that once the magnet reaches its operating current and target field, the coil terminals can be shorted and the power supply can be taken out of the loop. The operating current then stays within the magnet and, due to the low losses in the superconducting joints, decays only very little over time, which means that the magnet remains stable at its target field for an extended period of time. This is of particular importance for NMR type magnet systems.

Additionally, over time, ohmic losses in the electrical joints alter the current distribution in the magnet, leading to changes in the magnetic field profile and field instability, ultimately requiring complicated field compensation measures. These compensation measures would not be necessary if the HTS coil were capable of operating in "persistence", resulting in very low losses, which can be achieved using superconducting electrical joints.

While methods are currently known in the art for creating superconducting joints in Bi-2212 round wire or tape conductors and also in Bi-2223 tape conductors, the known methods are impractical or incompatible with the current production techniques for HTS conductors. Known methods for creating superconducting joints in Bi-2223 tape conductors require an additional heat treatment of the joint after the coil is wound. This additional heat treatment is lengthy and complex, rendering it highly impractical for commercial production. Additionally, known methods for creating superconducting joints in Bi-2212 round wire or tape conductors are incompatible with the high pressure environment inside the furnace that is required during the heat treatment of the Bi-2212 required to establish the transport current carrying superconducting phase.

Accordingly, what is needed in the art is a system and method for establishing superconducting electrical joints in a Bi-2212 conductor, which introduces negligible ohmic resistance against the electrical current in the superconductor.

SUMMARY OF INVENTION

The present invention provides a system and method for establishing superconducting electrical joints in a Bi-2212 conductor comprising one or more individual Bi-2212 conductive segments.

The present invention provides a system and method for producing superconducting joints between superconductive segments of a Bi-2212 conductor, thereby eliminating the heat generating resistive joints that are commonly known in the art for connecting two or more smaller Bi-2212 conductive segments to create a Bi-2212 conductor of adequate length for use in a high-field magnetic system.

In one embodiment of the present invention, a method for establishing a high-temperature superconducting (HTS) joint is provided. The method includes securing a first end of a first Bi-2212 conductor segment adjacent to a first end of a second Bi-2212 conductor segment, wherein each of the Bi-2212 conductor segments comprises an exterior sheath surrounding at least a portion of an interior filament bundle of Bi-2212 material and surrounding the first end of the first Bi-2212 conductor segment and the first end of the second Bi-2212 conductor segment with joint forming material that is chemically compatible with the Bi-2212 material of the interior filament bundle. The method further includes, subjecting the first Bi-2212 conductor segment and the second Bi-2212 conductor segment to a superconducting heat treatment effective to establish the superconducting properties of the first Bi-2212 conductor segment and the second Bi-2212 conductor segment and to substantially simultaneously create a superconducting joint at the location of the joint forming material surrounding the first end of the first Bi-2212 conductor segment and the first end of the second Bi-2212 conductor segment.

Using the methods of the present invention, connective joints are formed between the various Bi-2212 conductive segments of a high-field magnetic system comprising one or more Bi-2212 magnetic coils and the superconducting properties of both the coils and the associated joints are then simultaneously established during the high-temperature heat treatment of the entire assembly (coil and joints), thereby resulting in a procedure that is very practical and compatible with the process for generating the Bi-2212 conductor joints.

It is known in the art that to improve the superconducting properties of a Bi-2212 conductor, it is necessary to apply high pressure during the superconducting heat treatment of the conductor. Accordingly, in the present invention the inventive joint forming process for forming a Bi-2212 superconductor from numerous shorter conductors is compatible with the high-pressure conditions required for the formation of the superconducting Bi-2212 conductor, thereby contributing to the practicality of the inventive method.

As such, the present invention provides a system and method for establishing superconducting electrical joints in a Bi-2212 conductor in which the electrical joints introduce negligible ohmic resistance against the electrical current in the superconductor.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In accordance with the present invention, shorter segments of Bi-2212 high-temperature superconducting (HTS) conductor segments are linked to form a longer of Bi-2212 HTS conductor using superconducting electrical joints.

Figure 1:
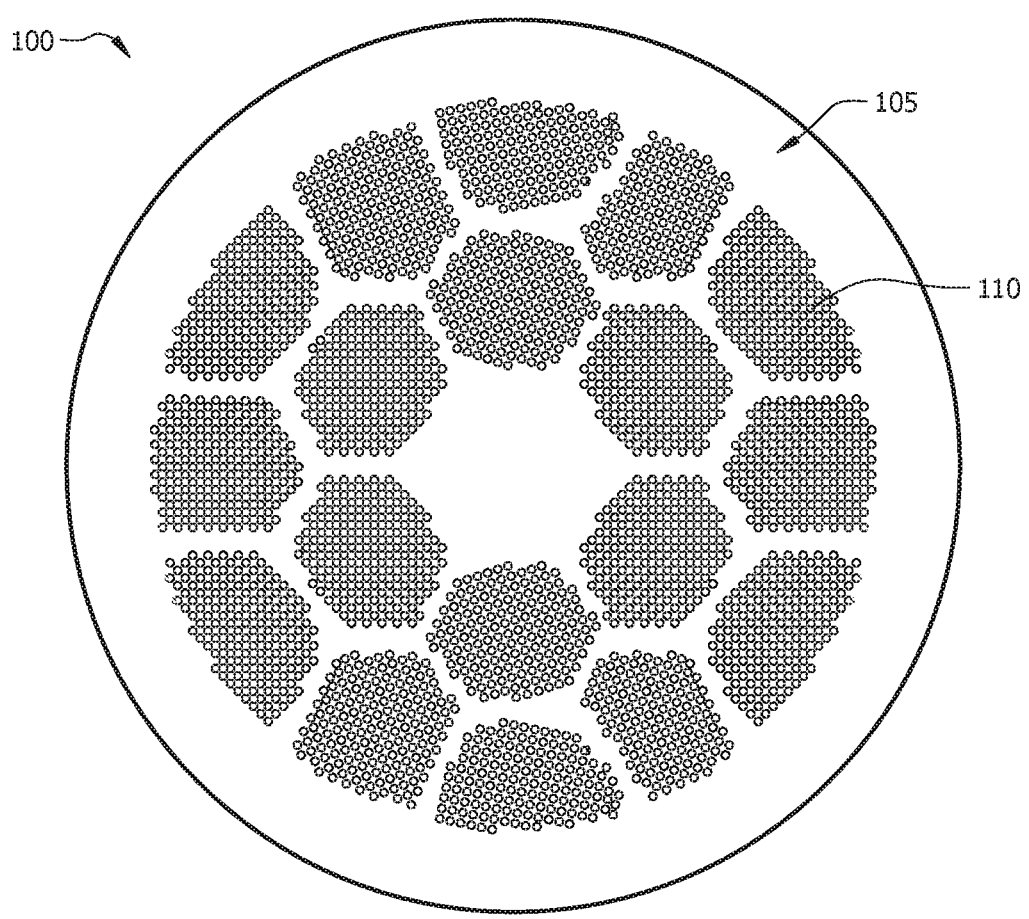
FIG. 1 is an exemplary illustration of a transverse cross-section view of a Bi-2212 superconducting wire, in accordance with an embodiment of the present invention.

With reference to FIG. 1, an example of a transverse cross section of a Bi-2212 high-temperature superconducting (HTS) conductor segment is illustrated. As shown in FIG. 1, in a round Bi-2212 conductor 100, an exterior sheath 105 surrounds an interior filament bundle of Bi-2212 material 110. In one embodiment, the exterior sheath 105 is a metallic material, such as silver or a silver alloy, however, other materials that are chemically compatible with the Bi-2212 material of the interior filament bundle 110 and with the heat treatment processes may be present as additions to the silver or may replace the silver or silver alloy. In an exemplary embodiment, the Bi-2212 conductor segment 100 is formed by a silver exterior sheath 105 surrounding a Bi-2212 interior filament bundle 110.

While the embodiment of the Bi-2212 conductor illustrated in FIG. 1 is a round conductor or wire having a circular cross-section, wires having a rectangular cross-section and Bi-2212 tape conductors having a high aspect ratio are also within the scope of the present invention.

In an exemplary embodiment, prior to the superconducting heat treatment, the Bi-2212 material inside the conductive segment is typically present as a highly densified, but somewhat porous, powder. To establish the high transport current carrying capabilities in the Bi-2212 conductor segment, it is necessary to treat the Bi-2212 conductor segment at temperatures of ~890° C. and at elevated pressures of up to 100 bar, to form a well connected and dense superconducting crystallographic phase of Bi-2212 material inside the conductor segment. Similar superconducting heat treatment conditions are also required for the establishment of the superconducting joints between the superconductor segments in accordance with the present invention, as described in more detail below. In the present invention, the superconducting heat treatment of the entire conductor, which is usually wound into some magnet coil, and the formation of the superconducting joints are carried out substantially simultaneously in the same superconducting heat treatment process. While the heating vessel temperature for the superconducting heat treatment may be between ~870° C. and ~900° C. and the elevated pressure in the vessel may be up to 100 bar, these settings are exemplary in nature and other settings may be used, as are commonly known in the art for the densification of Bi-2212 wires.

In accordance with the present invention, in preparing the smaller segments of Bi-2212 conductor for the superconducting heating and joint formation process, the ends of the conductors that will form the superconducting joints are brought together so that they are in close contact with each other and then surrounded by Bi-2212 or a Bi-2212 chemically compatible material. The close contact between the Bi-2212 conductor segments can be achieved by various means.

Figure 2:
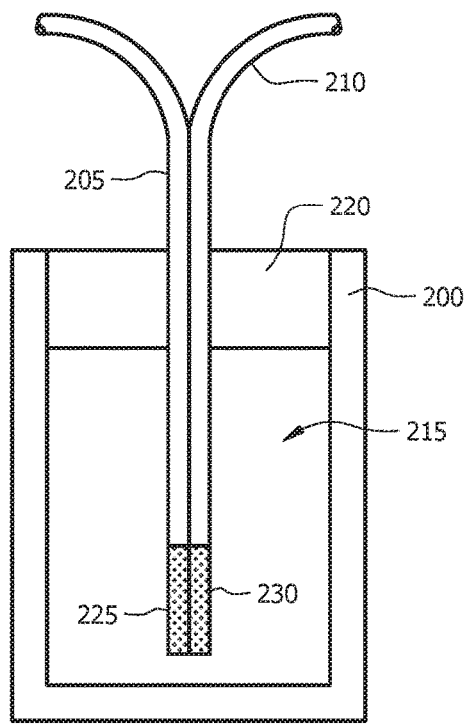
FIG. 2 is an exemplary illustration of a process for creating a Bi-2212 superconducting joint utilizing a sealed pressure tight cup, in accordance with the present invention.

As illustrated with reference to FIG. 2, in one embodiment for creating a superconducting joint between two Bi-2212 conductor segments, the end 225 of a first Bi-2212 conductor segment 205 and the end 230 of a second Bi-2212 conductor segment 210 may be secured adjacent to each other and extended into a sealed pressure tight cup 200 prior to the winding of the coil and the application of the superconducting heat treatment. Bi-2212 or a Bi-2212 chemically compatible material 215 may be placed in the cup 200 to surround the end 225 of the first Bi-2212 conductor segment 205 and the end 230 of the second Bi-2212 conductor segment 210. The sealed pressure tight cup 200 may be made out of silver or a compatible alloy and may include a sealed pressure tight cup lid 220 made out of silver or a compatible alloy. In this embodiment, the ends 225, 230 of the first conductor segment 205 and the second conductor segment 210 are substantially aligned side-by-side with the ends 225, 230 of the segments substantially even with each other to establish transverse contact between the ends 225, 230. To further encourage close contact between the ends 225, 230 of the segments, the ends 225, 330 may be secured together with a silver or silver alloy wire or another material that is chemically compatible with the Bi-2212. In one embodiment, the interior filament bundle of Bi-2212 at the ends 225, 230 of the conductors segments 205, 210 may be surrounded by an exterior sheath. Alternatively, in an additional embodiment, the exterior sheath may be stripped from the ends 225, 230 of the conductor segments 205, 210 prior to placing the ends 225, 230 in the sealed pressure tight cup 200. In the embodiment of FIG. 2, the exterior sheath has been stripped from the ends 225, 230 of the conductor segments 205, 210, exposing the interior filament bundle of Bi-2212. Creating a high-temperature superconducting (HTS) system of a desired length may require that a plurality of conductor segments be connected together by superconducting joints. As such, in this embodiment, after the ends 225, 230 of each of the conductor segments have been placed into a sealed pressure tight cup 200, the conductor segments 205, 210 and the sealed pressure tight cups 200, along with one or more Bi-2212 wire would coils, may then be subjected to conditions effective to establish the superconducting properties of the one or more coils and to substantially simultaneously create a superconducting joint from the joint forming material in the sealed pressure tight cup 200 surrounding the end 225 of the first one of the plurality of Bi-2212 conductor segments 205 and the end 230 of the second one of the plurality of Bi-2212 conductor segments 210, thereby forming a high-temperature superconducting (HTS) system comprising a plurality of Bi-2212 conductor segments having superconducting joints between the segments.

Figure 3:
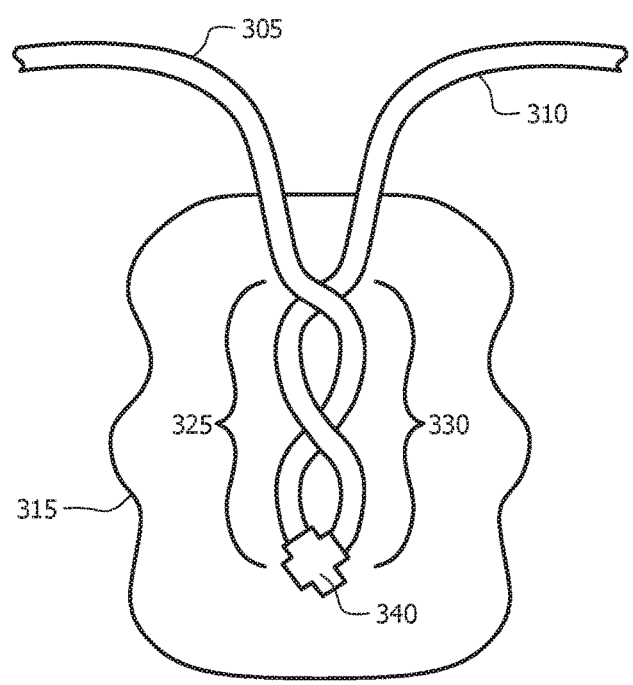
FIG. 3 is an exemplary illustration of a process for creating a Bi-2212 superconducting joint in which the ends of the Bi-2212 conductors are tied together and embedded with Bi-2212, in accordance with the present invention.

With reference to FIG. 3, in an additional embodiment, a first end 325 of a Bi-2212 conductor segment 305 and a second end 330 of a Bi-2212 conductor segment 310 may be secured together by tying the ends 325, 330 together using a piece of wire 340 as illustrated with reference to FIG. 3. The wire 340 may be silver or any other compatible material as previously mentioned. As illustrated in FIG. 3, the ends 325, 330 of the conductors segments 305, 310 may be twisted together prior to securing with the wire 340. After the ends 325, 330 of the conductor segments 305, 310 have been secured together by the wire 340, the wire and the ends 325, 330 may be surrounded by a Bi-2212 material or a Bi-2212 chemically compatible material 315. In one embodiment, the interior filament bundle of Bi-2212 at the ends 325, 330 of the conductors segments 305, 310 may be surrounded by an exterior sheath. Alternatively, in an additional embodiment, the exterior sheath may be stripped from the ends 325, 330 of the conductor segments 305, 310 prior to securing the ends 325, 330 together. In the embodiment of FIG. 3, the exterior sheath has not been stripped from the ends 325, 330 of the conductor segments 305, 310. Creating a high-temperature superconducting (HTS) system of a desired length may require that a plurality of conductor segments be connected together by superconducting joints. As such, in this embodiment, after the ends 325, 330 of each of the conductor segments have been secured together by the wire 340, the plurality of conductors segments and one or more Bi-2212 wire wound coils may then be subjected to conditions effective to establish the superconducting properties of the one or more coils and to substantially simultaneously create a superconducting joint from the joint forming material surrounding the end 325 of the first one of the plurality of Bi-2212 conductor segments 305 and the end 330 of the second one of the plurality of Bi-2212 conductor segments 310, thereby forming a high-temperature superconducting (HTS) system comprising a plurality of Bi-2212 conductor segments having superconducting joints between the segments.

Figure 4:
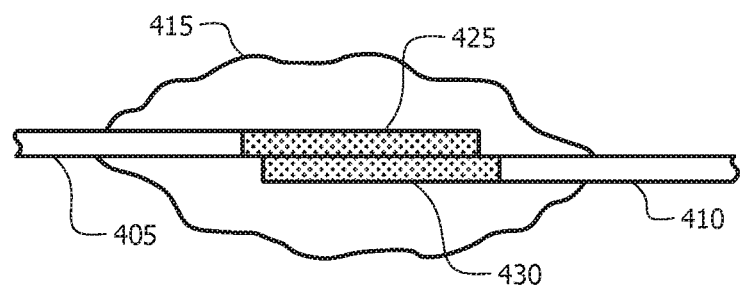
FIG. 4 is an exemplary illustration of a process for creating a Bi-2212 superconducting joint in which the ends of the Bi-2212 conductors are overlapped and embedded with Bi-2212, in accordance with the present invention.

With reference to FIG. 4, in an additional embodiment, close contact between an end 425 of a first one a plurality of Bi-2212 conductor segments 405 and an end 430 of a second one of that plurality of Bi-2212 conductor segments may be achieved by placing the ends 425, 430 of the conductor segments 405, 410 in an overlapping configuration, forming longitudinal along a portion of the length of the segments 405, 410, as shown with reference to FIG. 4. The overlapping portion of the ends 425, 430 may then be surrounded by a Bi-2212 material or a Bi-2212 chemically compatible material 415. The overlapping portions of the ends 425, 430 may additionally be secured together by a silver or silver alloy wire as illustrated with reference to FIG. 3. In one embodiment, the interior filament bundle of Bi-2212 at the ends 425, 430 of the conductors segments 305, 310 may be surrounded by an exterior sheath. Alternatively, in an additional embodiment, the exterior sheath may be stripped from the ends 425, 430 of the conductor segments 405, 410 prior to positioning the ends 425, 430 in an overlapping configuration. In the embodiment of FIG. 4, the exterior sheath has been stripped from the ends 425, 430 of the conductor segments 405, 410, exposing the interior filament bundle of Bi-2212. Creating a high-temperature superconducting (HTS) system of a desired length may require that a plurality of conductor segments be connected together by superconducting joints. As such, in this embodiment, after the ends 425, 430 of each of the conductor segments have been overlapped and secured together by a silver or silver-alloy wire, the plurality of conductors segments and on or more Bi-2212 wire wound coils may then be subjected to conditions effective to establish the superconducting properties of the one or more coils and to substantially simultaneously create a superconducting joint from the joint forming material surrounding the end 425 of the first one of the plurality of Bi-2212 conductor segments 405 and the end 430 of the second one of the plurality of Bi-2212 conductor segments 410, thereby forming a high-temperature superconducting (HTS) system comprising a plurality of Bi-2212 conductor segments having superconducting joints between the segments.

After the wire ends of the Bi-2212 conductor segments have been brought into close contact by any one of the configurations shown in FIG. 2, FIG. 3 or FIG. 4, in preparation for the superconducting heat treatment, the wire ends that form the joint area are surrounded by Bi-2212 material. Surrounding the joint area may be accomplished by coating the ends with Bi-2122 or by embedding the ends in Bi-2212 or Bi-2212-silver or other compatible Bi-2212 alloy mixture over a certain portion of the contact length, as shown with reference to FIG. 2, FIG. 3 and FIG. 4. Coating the wires can be accomplished in various ways, e.g. by using a powder containing the Bi-2212 or slurry containing the Bi-2212 or other ways that put Bi-2212 close to the joint area. The Bi-2212 can be formed from chemical components that have the stoichiometry of Bi-2212 but do not necessarily contain the Bi-2212 crystallographic phase.

In an additional embodiment, to ensure the buildup of a pressure differential between the furnace environment utilized during the superconducting heat treatment and the interior of the Bi-2212 conductors segments, thereby ensuring densification of the Bi-2212 inside the conductor segments, the ends of the conductor segments may be sealed prior to the application of the superconducting heat treatment. Sealing the ends of the conductor segments may be carried out in several ways. In one embodiment, if the ends of the conductor segments have not been prepared to expose the Bi-2212 filament bundles, the ends can be sealed using molten silver so that the conductor segment and the joint can be pressurized during the superconducting heat treatment. Alternatively, if the ends of the conductor segments have been prepared, thereby exposing the Bi-2212 filament bundles, the assembled coil, or just the joint alone, may be heated close to the partial melting temperature of the Bi-2212, thus sealing the ends of the conductor segments. After the ends of the conductor segments have been sealed, high pressure can be applied for the remainder of the superconducting heat treatment to complete the full reaction process and ensure densification of the Bi-2212.

Figure 5:
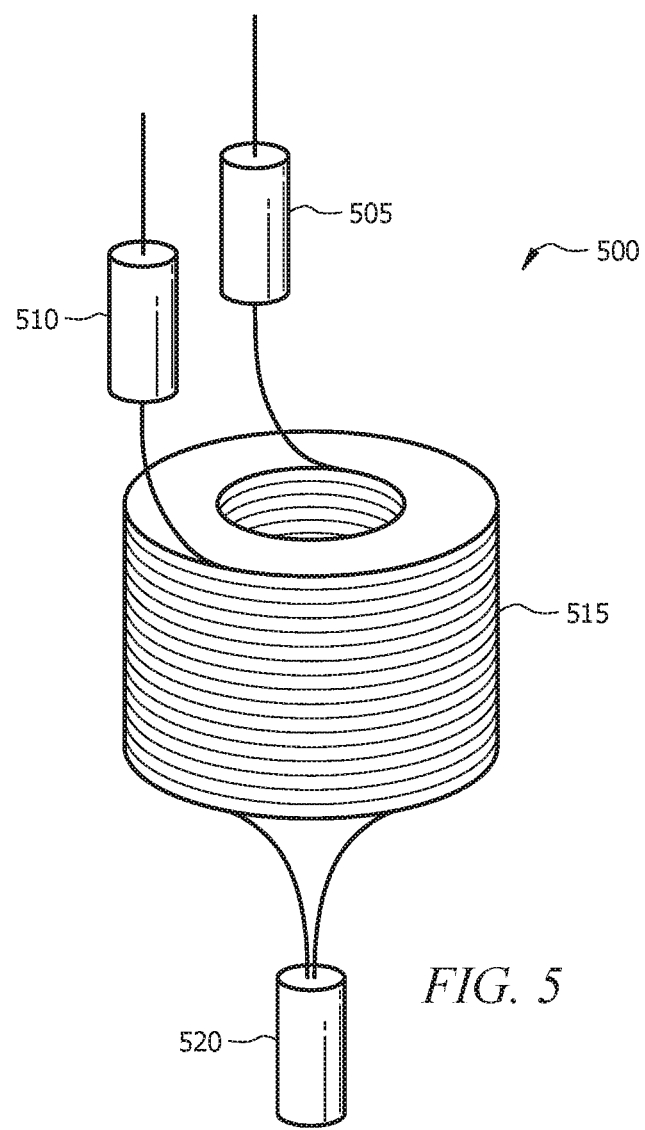
FIG. 5 is an illustration of a solenoid with superconducting joints between the coil segments and at the coil terminals, in accordance with an embodiment of the present invention.
Figure 6:
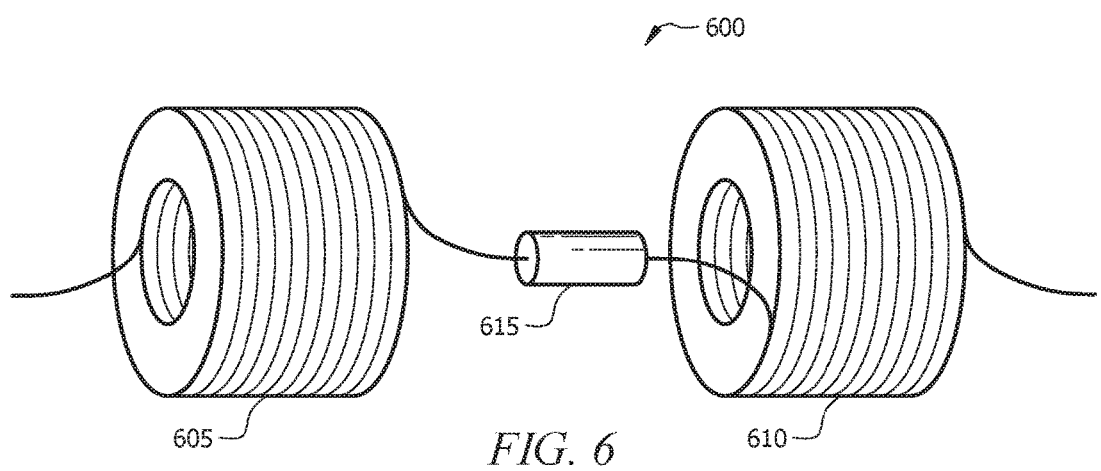
FIG. 6 is an illustration of a split magnet configuration with a superconducting joint between two coils, in accordance with an embodiment of the present invention.

Superconducting joints such as those illustrated with reference FIG. 2, FIG. 3 and FIG. 4 can be used in several places within a Bi-2212 wire wound superconducting coil or coil assembly. FIG. 5 and FIG. 6 illustrate two possible coil configurations using the joined conductor segments.

FIG. 5 illustrates a solenoid 500 having a Bi-2212 wire wound coil 515 with superconducting joints 520 between individual Bi-2212 wire wound coil sections and superconducting joints 505, 510 at the Bi-2212 wire wound coil terminals. FIG. 6 illustrates a split magnet configuration 600 with a superconducting joint 615 between a first Bi-2212 wire wound coil 605 and a second Bi-2212 wire wound coil 610. A split magnet 600 may be used in instances where lateral access to the center plane of the magnet is required.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method for establishing a high-temperature superconducting (HTS) joint, the method comprising:

securing a first end of a first Bi-2212 conductor segment adjacent to a first end of a second Bi-2212 conductor segment, wherein each of the Bi-2212 conductor segments comprises an exterior sheath surrounding at least a portion of an interior filament bundle of Bi-2212 material;

surrounding the first end of the first Bi-2212 conductor segment and the first end of the second Bi-2212 conductor segment with joint forming material that is chemically compatible with the Bi-2212 material of the interior filament bundle; and subjecting the first Bi-2212 conductor segment and the second Bi-2212 conductor segment to a superconducting heat treatment effective to establish the superconducting properties of the first Bi-2212 conductor segment and the second Bi-2212 conductor segment and to substantially simultaneously create a superconducting joint at the location of the joint forming material surrounding the first end of the first Bi-2212 conductor segment and the first end of the second Bi-2212 conductor segment.

2. The method of claim 1, wherein securing a first end of a first Bi-2212 conductor segment adjacent to a first end of a second Bi-2212 conductor segment further comprises, securing the first end of the first Bi-2212 conductor segment and the first end of the second Bi-2212 with a Bi-2212 chemically compatible wire.

3. The method of claim 2, wherein the Bi-2212 chemically compatible wire is a silver or silver alloy wire.

4. The method of claim 1, wherein securing a first end of a first Bi-2212 conductor segment adjacent to a first end of a second Bi-2212 conductor segment further comprises, placing the first end of the first Bi-2212 conductor segment and the first end of the second Bi-2212 conductor segment in longitudinal contact and securing the ends with a Bi-2212 chemically compatible wire.

5. The method of claim 1, wherein securing a first end of a first Bi-2212 conductor segment adjacent to a first end of a second Bi-2212 conductor segment further comprises, placing the first end of the first Bi-2212 conductor segment and the first end of the second Bi-2212 conductor segment in transverse contact and securing the ends with a Bi-2212 chemically compatible wire.

6. The method of claim 1, wherein securing a first end of a first Bi-2212 conductor segment adjacent to a first end of a second Bi-2212 conductor segment further comprises, placing the first end of the first Bi-2212 conductor segment and the first end of the second Bi-2212 conductor segment in transverse contact within an interior of a sealed pressure tight cup containing the joint forming material and securing the ends with a Bi-2212 chemically compatible wire.

7. The method of claim 6, wherein the sealed pressure tight cup is formed of silver or silver alloy.

8. The method of claim 1, wherein securing a first end of a first Bi-2212 conductor segment adjacent to a first end of a second Bi-2212 conductor segment further comprises, twisting the first end of a first Bi-2212 conductor segment together with the first end of a second Bi-2212 conductor segment and securing the ends with a Bi-2212 chemically compatible wire.

9. The method of claim 1, further comprising removing a portion of the exterior sheath of the first end of the first Bi-2212 conductor segment and the first end of the second Bi-2212 conductor segment prior to securing the first end of the first Bi-2212 conductor segment adjacent to the first end of the second Bi-2212 conductor segment.

10. The method of claim 1, wherein the joint forming material is a powdered Bi-2212 material.

11. The method of claim 1, wherein the joint forming material is a slurry Bi-2212 material.

12. The method of claim 1, wherein the first Bi-2212 conductor segment further comprises a Bi-2212 wire wound coil at the second end of the first Bi-2212 conductor segment.

13. The method of claim 1, wherein the second Bi-2212 conductor segment further comprises a Bi-2212 wire wound coil at the second end of the second end of the Bi-2212 conductor segment.

14. The method of claim 1, further comprising a Bi-2212 wire wound coil at a second end of the first Bi-2122 conductor segment and a second end of the second Bi-2212 conductor segment.

15. A method for establishing a high-temperature superconducting (HTS) joint, the method comprising:
   securing a first end of a first Bi-2212 conductor segment adjacent to a first end of a second Bi-2212 conductor segment with a Bi-2212 chemically compatible wire, wherein each of the Bi-2212 conductor segments comprises an exterior sheath surrounding at least a portion of an interior filament bundle of Bi-2212 material;
   surrounding the first end of the first Bi-2212 conductor segment and the first end of the second Bi-2212 conductor segment with joint forming material that is chemically compatible with the Bi-2212 material of the interior filament bundle; and
   subjecting the first end of the first Bi-2212 conductor segment and the first end of the second Bi-2212 conductor segment to a superconducting heat treatment effective to establish the superconducting properties of the first Bi-2212 conductor segment and the second Bi-2212 conductor segment and to substantially simultaneously create a superconducting joint at the location of the joint forming material surrounding the first end of the first Bi-2212 conductor segment and the first end of the second Bi-2212 conductor segment.

16. The HTS joint of claim 15, wherein the process further comprises securing the first end of the first Bi-2212 conductor segment and the first end of the second Bi-2212 with a Bi-2212 chemically compatible wire.

17. A high-temperature superconducting (HTS) joint prepared by a process comprising the steps of:
   securing a first end of a first Bi-2212 conductor segment adjacent to a first end of a second Bi-2212 conductor segment, wherein each of the Bi-2212 conductor segments comprises an exterior sheath surrounding at least a portion of an interior filament bundle of Bi-2212 material;
   surrounding the first end of the first Bi-2212 conductor segment and the first end of the second Bi-2212 conductor segment with joint forming material that is chemically compatible with the Bi-2212 material of the interior filament bundle; and
   subjecting the first end of the first Bi-2212 conductor segment and the first end of the second Bi-2212 conductor segment to a superconducting heat treatment effective to establish the superconducting properties of the first Bi-2212 conductor segment and the second Bi-2212 conductor segment and to substantially simultaneously create a superconducting joint at the location of the joint forming material surrounding the first end of the first Bi-2212 conductor segment and the first end of the second Bi-2212 conductor segment.

18. The HTS joint of claim 17, wherein the exterior sheath is silver or silver alloy.

19. The HTS joint of claim 17, wherein the joint forming material is powder Bi-2212.

20. The HTS joint of claim 17, wherein the joint forming material is slurry Bi-2212.

* * * * *